3,518,269
1-OXIME SUBSTITUTED QUINOLIZINES
Richard E. Brown, Hanover, and Robert I. Meltzer, Rockaway, N.J., assignors to Warner-Lambert Pharmaceutical Company, Morris Plains, N.J., a corporation of Delaware
No Drawing. Filed May 4, 1967, Ser. No. 636,024
Int. Cl. C07d 101/00
U.S. Cl. 260—286     3 Claims

ABSTRACT OF THE DISCLOSURE

The present invention relates to 1-oxime substituted quinolizines of the Formula I:

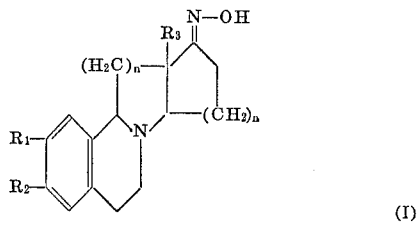

(I)

wherein $R_1$ and $R_2$ represent hydrogen, hydroxy, or lower alkoxy; $R_3$ represents hydrogen, or lower alkyl; $n$ may be 1, 2, or 3.

---

The present invention relates to novel 1-oxime substituted quinolizines of formula:

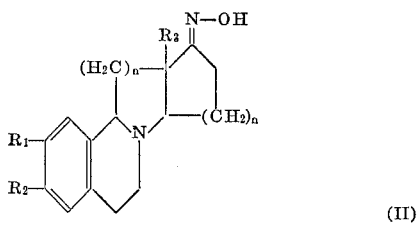

(II)

wherein $R_1$ and $R_2$ represent hydrogen, hydroxy, or lower alkoxy of 1 to 6 carbon atoms, such as methoxy, ethoxy, propoxy, and the like; $R_3$ represents hydrogen or lower alkyl, such as methyl, ethyl, propyl, and the like; $n$ may be 1, 2, or 3.

The compounds of this invention increase the strength of skeletal muscles in a mammalian host and are therefore, useful as agents to increase the strength of skeletal muscle. They are used in conditions associated with the loss of skeletal muscle strength. In order to use these compounds, they are combined with an inert pharmaceutical carrier, such as lactose, starch, mannitol, dicalcium phosphates, and the like, to form dosage forms, such as tablets, powders, suspensions, and the like. They are administered orally or by parenteral injection at a dose of about 100 to 500 mg. several times daily.

The compounds of this invention are useful as intermediates for the production of compounds of the formula:

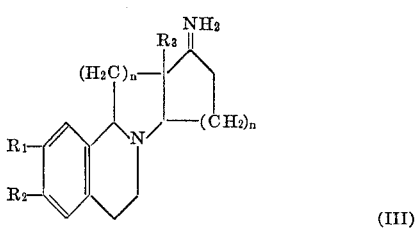

(III)

Compound III may be obtained by reducing compound I with a suitable reducing agent, as for example, lithium aluminum hydride. The resulting compound III is useful in the treatment of circulatory collapse and may be used in accordance with the teachings of The Journal of Pharmacology and Experimental Therapeutics, vol. 147, No. 2, p. 225, et. seq.

EXAMPLE 1

The starting compound II may be prepared according to the teachings disclosed in our co-pending application, Ser. No. 248,872, filed Jan. 3, 1963 now U.S. Pat. No. 3,341,543, or that disclosed in Tetrahedron Letters 1581 (1963).

The compounds of this invention form acid addition salts with pharmaceutically acceptable acids such as hydrochloric acid, hydrobromic acid, hydriodic acid, nitric acid, phosphoric acid, sulfuric acid; acetic acid, citric acid, tartaric acid, lactic acid, benzenesulfonic acid, toluene sulfonic acid, etc., and these salts are also within the scope of this invention.

The following examples are included in order further to illustrate the invention.

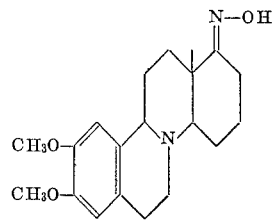

2,3,4,4a,6,7,11b,12,13,13a-decahydro-9,10-dimethoxy-13a-methyl-1H-dibenzo [a,f] quinolizine-1-one-oxime-hydrochloride A solution of 12.5 g. of 2,3,4,4a6,7,11b,12,13,13a-decahydro 9, 10 - dimethoxy - 13a - methyl-1H - dibenzo [a,f] quinolizine-1-one in 100 ml. each of ethanol and pyridine is treated with 6 grams of hydroxylamine hydrochloride in 25 ml. of ethanol. The solution is stirred at reflux for 4 hrs. during which time precipitation of a white solid takes place. The slurry is cooled and filtered, and the product is air dried to give 2,3,4,4a,6,7,11b,12,13a-decahydro - 9,10 - dimethoxy - 13a -methyl - 1H - dibenzo [a,f] quinolizine-1-one-oxime-hydrochloride as white crystals, M.P. 247°–250°. The melting point may be raised to 250–252° by recrystallization from water. The free base is obtained by treating the hydrochloride with 5% sodium hydroxide as described in Example 2.

The compounds of this invention may be prepared by reacting a ketone of the formula:

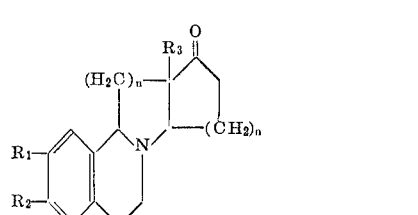

(II)

with a reagent such as hydroxylamine or its acid addition salts, such as its hydrochloride or its sulfate salt. Such reactions are preferably carried out in an inert solvent, such as a lower molecular weight alcohol in the presence of a base, such as an alkali metal hydroxide, for example, sodium or potassium hydroxide. Such reactions may also be carried out in an organic base, such as pyridine and the like.

EXAMPLE 2

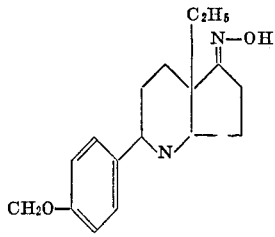

1,2,3,3a,5,6,10b,11,12,12a-decahydro-8-methoxy-12a-ethyl-benz[a]cyclopenta[f]quinolizine-1-one-oxime In the same way as described in Example 1, 10 g. of 1,2,3,3a,5,6,10b,11,12,12a-decahydro - 8 - methoxy-12a-ethyl-benz[a]cyclopenta[f]quinolizine-1-one gives the hydrochloride of 1,2,3,3a,5,6,10b,11,12,12a-decahydro-8-methoxy - 12a - ethyl-benz[a]cyclopenta[f]quinolizine-1-one-oxime. This is dissolved in 100 ml. of water, made basic with 5% sodium hydroxide, and the base filtered and recrystallized from ethanol to give 1,2,3,3a,5,6,10b, 11,12,12a-decahydro-8-methoxy-12a-ethyl - benz[a]cyclopenta[f]quinolizine-1-one-oxime as white crystals, M.P. 208–210°.

We claim:
1. A member selected from the group consisting of a free base of the formula:

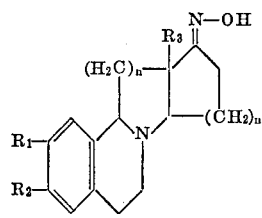

(I)

wherein $R_1$ and $R_2$ each are hydrogen, hydroxy, or lower alkoxy; $R_3$ is hydrogen, methyl or ethyl; and $n$ may be 1 or 2; and the non-toxic pharmaceutically acceptable acid addition salts thereof.

2. The free base of claim 1 which is: 2,3,4,4a,6,7,11b, 12,13,13a-decahydro-9,10-dimethoxy - 13a - methyl-1H-dibenzo[a,f]quinolizine-1-one-oxime-and its non-toxic pharmaceutically acceptable acid addition salts.

3. The free base of claim 1 which is: 1,2,3,3a,5,6,10b, 11,12,12a - decahydro-8-methoxy-12a-ethyl-benz[a]cyclopenta[f]quinolizine-1-one-oxime and its non-toxic pharmaceutically acceptable acid addition salts.

References Cited

UNITED STATES PATENTS

| | | | |
|---|---|---|---|
| 3,150,135 | 9/1964 | Forman | 260—283 X |
| 3,326,920 | 6/1967 | Stanaback et al. | 260—286 |
| 3,326,921 | 6/1967 | Stanaback et al. | 260—286 |
| 3,341,543 | 9/1967 | Melzer et al. | 260—287 X |

DONALD G. DAUS, Primary Examiner

U.S. Cl. X.R.

424—258